Patented Jan. 6, 1931

1,788,299

UNITED STATES PATENT OFFICE

JOHANN HUISMANN AND HUGO SCHWEITZER, OF WIESDORF-ON-THE-RHINE, AND RICHARD STÜSSER, OF COLOGNE-DEUTZ, GERMANY, ASSIGNORS TO GENERAL ANILINE WORKS, INC., OF NEW YORK, N. Y., A CORPORATION OF DELAWARE

SOLUBLE AZO DYES

No Drawing. Application filed January 19, 1928, Serial No. 248,505, and in Germany January 19, 1927.

The present invention concerns new and valuable azo dyestuffs of the general formula

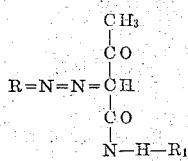

wherein R represents an aromatic nucleus which is substituted by a nitro group in ortho position to the azo group and which may be further substituted by any substituent with the exception of a sulfo group and $R_1$ represents an aromatic nucleus which is substituted by a sulfo group and which may be further substituted.

Our new dyestuffs can be prepared, for instance, by coupling a diazotized ortho-nitro-arylamine with an aceto-acetarylide and treating the azo dyestuff thus obtained with a sulfonating agent in the usual manner, e. g. sulfuric acid monohydrate or chlorosulfonic acid in an inorganic or organic solvent such as sulfuric acid monohydrate or chlorobenzene, thus converting the same into derivatives which are sulfonated in the aryl nucleus of the coupling components or alternatively by coupling a diazotized arylamine with an aceto-acetarylide compound which is substituted in the aryl residue by a sulfonic acid group.

Our new dyestuffs, after being dried and pulverized, are generally in the form of their alkali metal salt yellow to orange powders soluble in water and sulfuric acid with a yellow coloration, difficulty soluble or insoluble in organic solvents. The color lakes prepared from them are distinguished by full yellow shades, clearness and fastness to light. The new products dye wool evenly clear yellow shades of superior fastness to light and fulling.

The following examples will illustrate our invention without limiting it thereto.

*Example 1.*—374.5 parts by weight of the dyestuff 3-nitro-1-methyl-benzene-4-azo-aceto-acet-ortho-chloroanilide are introduced gradually at about 10° C. into 7500 parts by weight of sulfuric acid monohydrate. Stirring is effected for several hours, the temperature gradually rising to about 20° C. When the sulfonation is complete the mass is poured on to ice and water, the precipitated dyestuff is filtered off, rendered alkaline with sodium carbonate and dissolved in hot water. It is agains precipitated from the hot solution with a small amount of common salt, filtered and dried and forms a light yellow powder. In its free state it has most probably the following formula

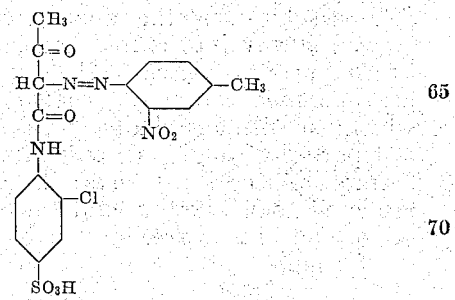

When used as a size color it gives a greenish-yellow lake, which is distinguished by the clearness of its shade and fastness to light and water. The dyeings produced by the dyestuff on wool are of greenish-yellow shades of outstanding fastness to light and fulling, the wool being dyed outstandingly evenly.

*Example 2.*—370 parts by weight of the dyestuff 3-nitro-1-methyl-benzene-4-azo-aceto-acet-ortho-anisidide are dissolved in about 10 times the weight of chlorobenzene while slowly heating. The solution is cooled down to about 60° C. and 140 parts by weight of chlorosulfonic acid are caused to drop in slowly while stirring well. The sulfonation commences soon with vigorous evolution of hydrogen-chloride. In order to complete the reaction heating is finally resorted to for some time to about 90° C., when the completely sulfonated mass is poured into water. The reaction mixture is rendered alkaline with a small excess of sodium carbonate and the chlorobenzene is removed by means of steam, passed through the solution. The dyestuff can then be salted out from the still hot filtered solution by the addition of common salt. In its free state it has most probably the formula

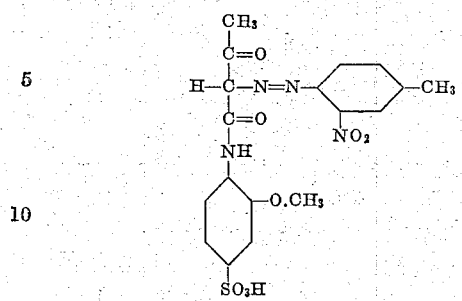

When dried it forms a yellow powder, which dissolves with ease in hot water, it can be easily precipitated to produce a clear yellow lake which is fast to light and water when used as a size color. It dyes wool evenly with clear, reddish-yellow shades, which are fast to light and fulling.

*Example 3.*—172.5 parts by weight of 4-chloro-2-nitro-aniline are mixed with water to form a paste and diazotized with 69 parts by weight of sodium nitrite in the usual manner in the presence of about 360 parts by weight of hydrochloric acid (19.5° Bé.). The filtered solution of the diazo compound is poured slowly into a cold aqueous solution of 278 parts by weight of the sodium salt of aceto-acet-2-anisidide-4-sulfonic acid to which has been added an aqueous solution of 500 parts by weight of crystallized sodium acetate. After some hours the solution is rendered soda alkaline and the dyestuff is salted out. In its free state it has probably the formula

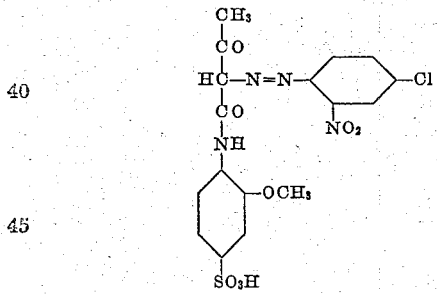

The sodium salt forms a yellow powder easily soluble in hot water, dyeing wool clear yellow shades, fast to light and fulling. It can be easily precipitated to produce a clear yellow lake which is fast to light and water when used as a size color.

We claim:—

1. As new products water soluble monoazo dyestuffs having most probably the formula

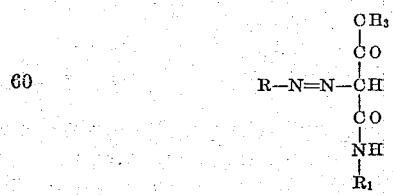

wherein R represents an unsulfonated aromatic nucleus which is substituted by a nitro group in ortho-position to the azo group and which may be further substituted and $R_1$ represents an aromatic nucleus which is substituted by a sulfo group and which may be further substituted; being in the form of the alkali metal salts yellow to orange powders, exhibiting various yellow shades of outstanding clearness and fastness to light and water as size colors and dyeing wool clear yellow shades of superior fastness to light and fulling.

2. As new products water soluble monoazo dyestuffs having most probably the formula:

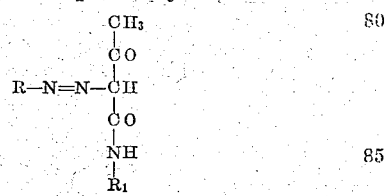

wherein R represents an unsulfonated benzene nucleus which is substituted by a nitro group in ortho-position to the azo group and which may be further substituted and $R_1$ represents a benzene nucleus which is substituted in para-position to the NH-group by a sulfonic acid group and which may be further substituted, said compounds being in the form of the alkali metal salts yellow to orange powders exhibiting various yellow shades of outstanding clearness and fastness to light and water as size colors and dyeing wool clear yellow shades of superior fastness to light and fulling.

3. As a new product the water soluble monoazo dyestuff having in its free state most probably the formula

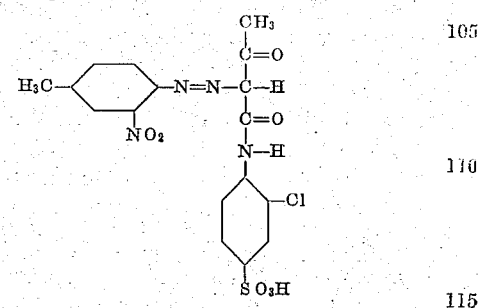

being in form of its sodium salt a light yellow powder exhibiting as a size color a yellow shade of outstanding clearness and fastness to light and water and dyeing wool clear yellow shades of good fastness to light and fulling.

In testimony whereof we have hereunto set our hands.

JOHANN HUISMANN.
HUGO SCHWEITZER.
RICHARD STÜSSER.